United States Patent
Fujii

(10) Patent No.: US 12,266,946 B2
(45) Date of Patent: Apr. 1, 2025

(54) ANTENNA DEVICE, POWER SUPPLYING DEVICE, AND POWER SUPPLYING METHOD

(71) Applicant: MINEBEA MITSUMI Inc., Nagano (JP)

(72) Inventor: Masaaki Fujii, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 260 days.

(21) Appl. No.: 18/044,124

(22) PCT Filed: Aug. 25, 2021

(86) PCT No.: PCT/JP2021/031251
§ 371 (c)(1),
(2) Date: Oct. 30, 2023

(87) PCT Pub. No.: WO2022/054586
PCT Pub. Date: Mar. 17, 2022

(65) Prior Publication Data
US 2024/0072577 A1    Feb. 29, 2024

(30) Foreign Application Priority Data

Sep. 10, 2020 (JP) .................................. 2020-151849

(51) Int. Cl.
*H02J 50/23* (2016.01)
*H01Q 3/36* (2006.01)
(Continued)

(52) U.S. Cl.
CPC ............ *H02J 50/23* (2016.02); *H02J 50/402* (2020.01); *H02J 50/90* (2016.02)

(58) Field of Classification Search
CPC .......... H02J 50/23; H02J 50/402; H02J 50/90; H01Q 3/36; H01Q 21/06
(Continued)

(56) References Cited

U.S. PATENT DOCUMENTS

2013/0222204 A1* 8/2013 Binzer ............... H01Q 21/0075
                                                   343/853
2014/0253029 A1   9/2014 Uchida et al.
(Continued)

FOREIGN PATENT DOCUMENTS

JP    2014-120816    6/2014
JP    2018-117456    7/2018
(Continued)

OTHER PUBLICATIONS

International Search Report for PCT/JP2021/031251 mailed on Nov. 16, 2021.

*Primary Examiner* — Rexford N Barnie
*Assistant Examiner* — Swarna N Chowdhuri
(74) *Attorney, Agent, or Firm* — IPUSA, PLLC

(57) ABSTRACT

An antenna device includes: an array antenna having antenna elements; phase shifters to adjust a phase of a power transmission signal supplied to each antenna element in a first axis direction; a camera to obtain an image through a fisheye lens; a memory; and a processor to execute converting a first position of a marker in the image, into a second position in polar coordinates on a first plane including the first and second axes; obtaining, from the second position, an elevation angle of the first position projected onto a second plane including the first and third axes, with respect to the third axis; storing in the memory, sets of phase data corresponding to elevation angles, representing phases adjusted to be aligned upon power transmission to a power (Continued)

receiver, for controlling the phase shifters to make a beam radiated by the array antenna directed at the elevation angle.

8 Claims, 5 Drawing Sheets

(51) Int. Cl.
*H02J 50/40* (2016.01)
*H02J 50/90* (2016.01)

(58) Field of Classification Search
USPC .......................................................... 307/147
See application file for complete search history.

(56) References Cited

U.S. PATENT DOCUMENTS

| | | | |
|---|---|---|---|
| 2015/0045091 | A1 | 2/2015 | Nakatani |
| 2016/0240934 | A1* | 8/2016 | Sato ........................ H01Q 13/20 |
| 2016/0248159 | A1* | 8/2016 | Shiozaki .............. H01Q 13/206 |
| 2019/0252795 | A1* | 8/2019 | Murata ................ H01Q 9/0457 |
| 2022/0021112 | A1 | 1/2022 | Fujii |

FOREIGN PATENT DOCUMENTS

| | | |
|---|---|---|
| JP | 2019-135900 | 8/2019 |
| JP | 2020-043699 | 3/2020 |
| JP | 2020-136918 | 8/2020 |
| WO | 2013/080285 | 6/2013 |

\* cited by examiner

ANTENNA DEVICE, POWER SUPPLYING DEVICE, AND POWER SUPPLYING METHOD

TECHNICAL FIELD

The present invention relates to an antenna device, a power supplying device, and a power supplying method

BACKGROUND ART

Conventionally, there has been a wireless power transmitting device that includes a beam transmitter to transmit a beam of energy for supplying power to a wireless power receiving device installed on a flying object; an information obtainment unit to obtain control information for increasing power receiving efficiency of the wireless power receiving device; and a control unit to control the energy beam based on the control information, so as to increase the power receiving efficiency of the wireless power receiving device. It is described that an array antenna may be used as a power transmission antenna (e.g., see Patent Document 1).

RELATED ART DOCUMENTS

Patent Documents

[Patent Document 1] Japanese Laid-Open Patent Application No. 2019-135900

SUMMARY OF THE INVENTION

Problem to be Solved by the Invention

Meanwhile, in the case where power is transmitted from multiple antenna elements of an array antenna so as to be received by a wireless power receiving device, and the wireless power receiving device is installed in a flying object as in a conventional wireless power transmitting device, there is a sufficient distance between the wireless power transmitting device (power supplying device) and the wireless power receiving device (power receiving device). Therefore, the angular difference among the multiple antenna elements and the power receiving device is negligible, and hence, even if power is transmitted from multiple antenna elements to the same target, the phase shift upon reception when the power receiving device receives power is small and hardly causes a problem.

However, in the case where the distance between the power receiving device and the power supplying device is a short distance of several meters, if power is transmitted from multiple antenna elements to the same target, when the power receiving device receives power, the angular difference from each antenna element to the power receiving device is great, and thereby, the phase shift upon power reception becomes great; therefore, a problem that the synthesized received power is reduced may arise.

Therefore, it is an object to provide an antenna device, a power supplying device, and a power supplying method that allows a power receiving device to efficiently receive power even at a short distance.

Means for Solving Problem

An antenna device according to the embodiment of the present invention includes an array antenna having a plurality of antenna elements arranged in two dimensions along a first axis and a second axis; a phase adjustment unit configured to adjust a phase of a power transmission signal supplied to each of the plurality of antenna elements in a first axis direction; an image obtainment unit configured to obtain an image through a fisheye lens; a position derivation unit configured to convert a first position of a marker relative to the image obtainment unit included in the image obtained by the image obtainment unit, into a second position in polar coordinates on a first plane including the first axis and the second axis; an elevation angle obtainment unit configured to obtain, based on the second position, an elevation angle of a projection position obtained by projecting the first position onto a second plane including the first axis and a third axis, with respect to the third axis in the second plane; a storage unit configured to store a plurality of sets of phase data corresponding to a plurality of elevation angles, the phase data representing a plurality of phases when power is transmitted from the plurality of antenna elements to a power receiving device positioned at a position of the marker, the plurality of phases received by the power receiving device from the plurality of antenna elements being adjusted to be aligned; and a control unit configured to read the phase data corresponding to the elevation angle obtained by the elevation angle obtainment unit from the storage unit, and control the phase adjustment unit based on the read phase data so as to make a direction of a beam radiated by the array antenna become the elevation angle in the second plane.

Advantageous Effects of the Invention

An antenna device, a power supplying device, and a power supplying method that allows a power receiving device to efficiently receive power even at a short distance, can be provided.

EMBODIMENTS FOR CARRYING OUT THE INVENTION

In the following, embodiments to which an antenna device, a power supplying device, and a power supplying method of the present invention are applied will be described.

Embodiments

Figure 1:
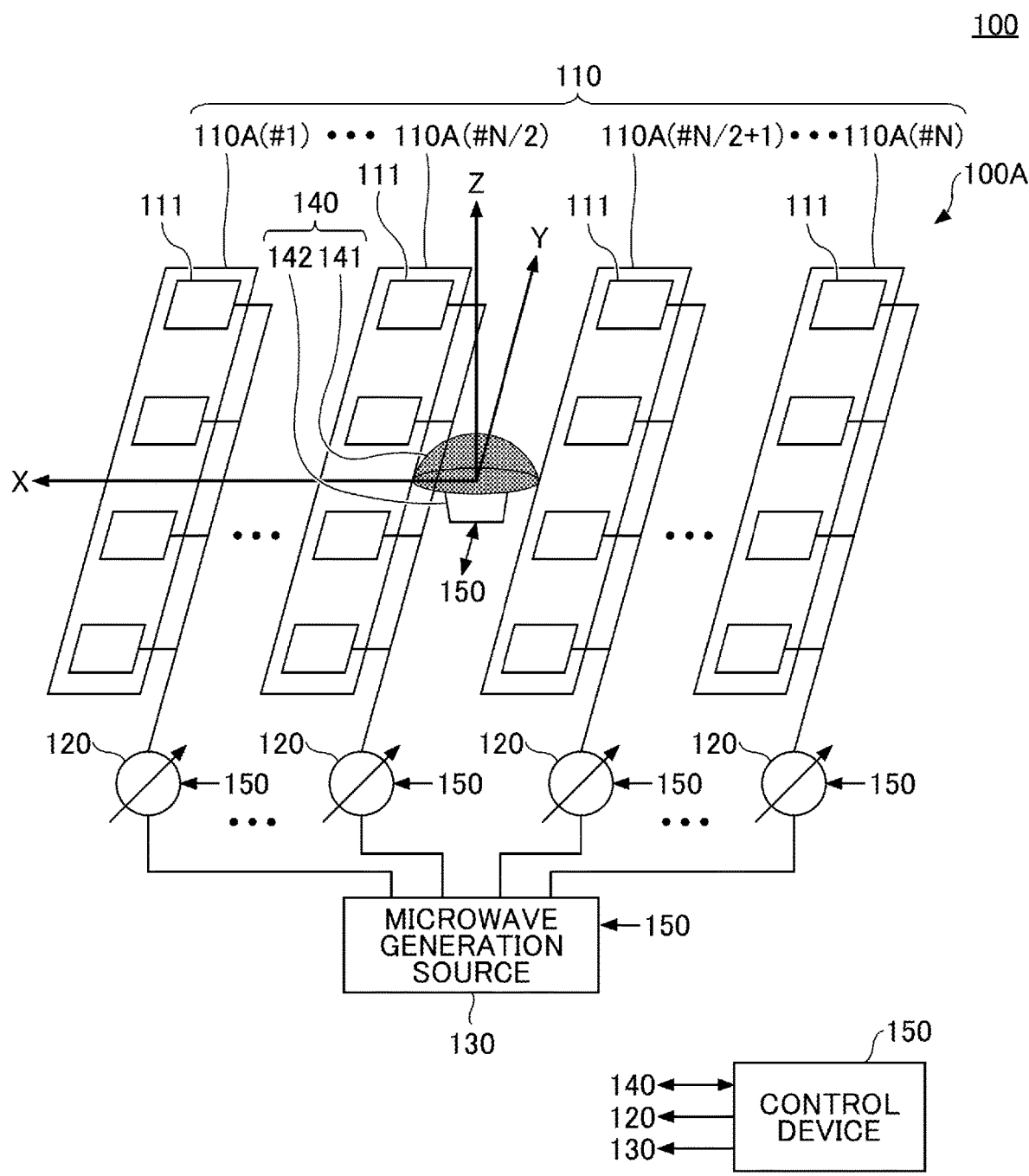
FIG. 1 is a diagram illustrating a power supplying device 100 of an embodiment.

FIG. 1 is a diagram illustrating a power supplying device 100 of an embodiment. The power supplying device 100 includes an array antenna 110, phase shifters 120, a microwave generation source 130, a camera 140, and a control device 150. An antenna device 100A according to an embodiment is obtained by removing the microwave generation source 130 from the power supplying device 100.

In the following, an XYZ coordinate system will be used for description. Plan view is a plan view on the XY plane. In addition, the X-axis is an example of a first axis, the Y-axis is an example of a second axis, and the Z-axis is an example of a third axis. In addition, the XY plane is an example of a first plane, and the XZ plane is an example of a second plane.

The array antenna 110 is grouped into, as an example, N sub-arrays 110A. The first (#1) to the N-th (#N) sub-arrays 110A are illustrated. Here, N is an integer greater than or equal to 2, and FIG. 1 illustrates a form in which N is, as an example, an even number greater than or equal to 4. The N sub-arrays 110A are arranged in the X-axis direction, and each of the sub-arrays 110A includes, as an example, four antenna elements 111. Therefore, the array antenna 110 includes, as an example, 4N antenna elements 111. The antenna element 111 is a patch antenna having a rectangular shape in plan view. The array antenna 110 may include a ground plate held at a ground potential on the negative side of the Z axis direction of the antenna element 111. Note that as an example, the center of the positions of the 4N antenna elements 111 is coincident with the origin of the XYZ-coordinate system. In addition, the number of antenna elements 111 included in each of the sub-arrays 110A simply needs to be greater than or equal to 2, and arranged in two dimensions.

Figure 2:
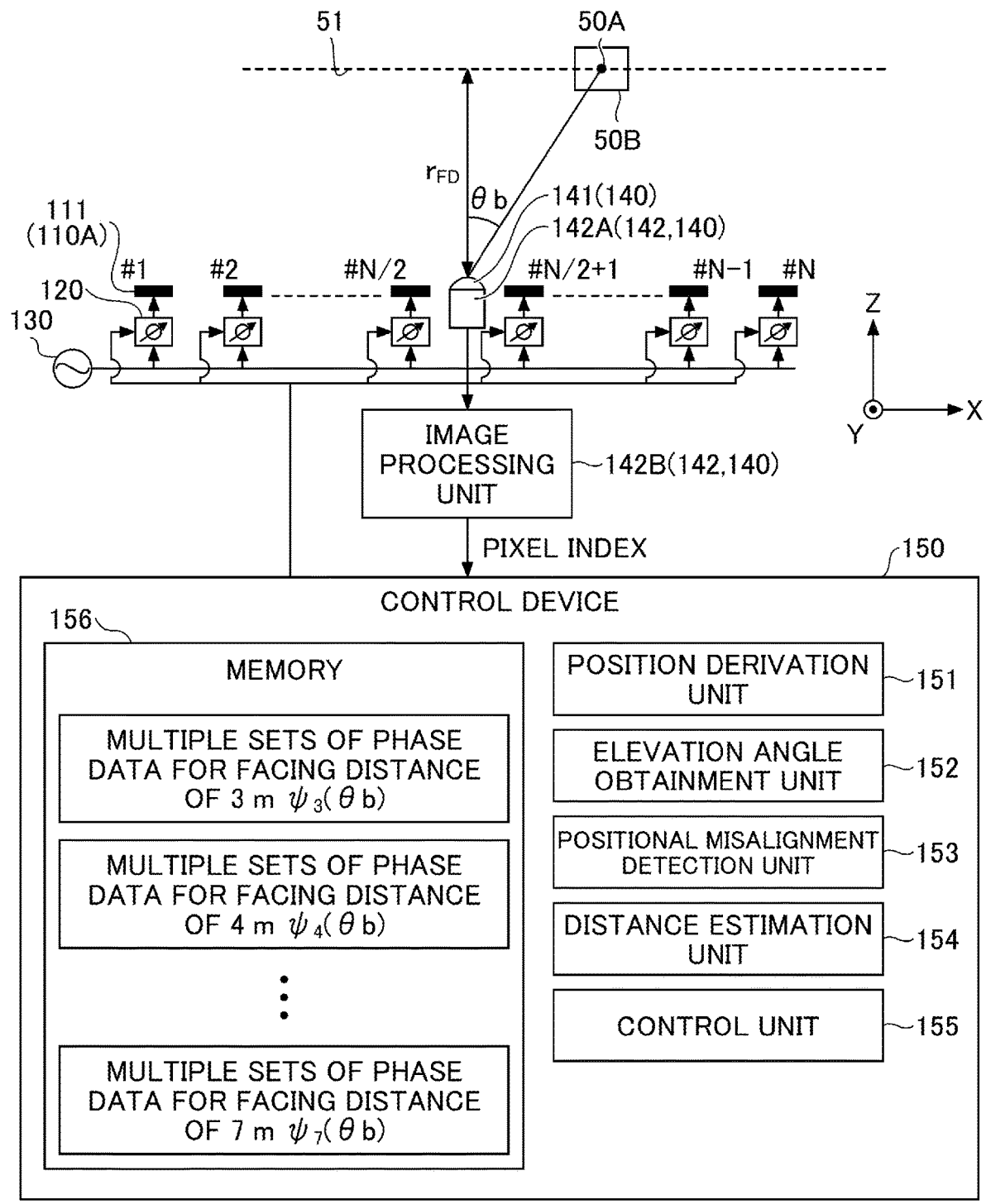
FIG. 2 is a diagram illustrating a power supplying device 100 of an embodiment.

In the following description, FIG. 2 will be used in addition to FIG. 1. FIG. 2 is a diagram illustrating the power supplying device 100 of the embodiment. In FIG. 2, although the origin of the XYZ coordinate system is shown to be shifted in order to make the drawing easier to see, in the following, as illustrated in FIG. 1, the description assumes that the origin of the XYZ-coordinate system is coincident with the center of the positions of the 4N antenna elements 111. In addition, FIG. 2 illustrates one antenna element 111 adjacent to the X-axis on the negative side of the Y axis direction for each sub-array 110A. In addition, FIG. 2 illustrates constituent elements included in the control device 150, a marker 50A, and a power receiving device 50B. The marker 50A and the power receiving device 50B are, as an example, fixed to an inner wall 51 of a tunnel. As an example, the antenna device 100A and the power supplying device 100 are installed on a work vehicle, and while traveling in the tunnel, detect the marker 50A attached to the inner wall 51 of the tunnel, and transmit power to the power receiving device 50B.

In addition, in FIG. 2, the marker 50A is present in a direction at an angle θb from the Z-axis in the XZ plan view. In FIG. 2, for sake of convenience of description, although the XYZ coordinate system is illustrated to be shifted, the origin of the XYZ-coordinate system is coincident with the center of the positions of the 4N antenna elements 111, and hence, the angle θb is an angle in the XZ-plane formed between a straight line connecting the origin of the XYZ-coordinate system and the marker 50A, and the Z-axis. As viewing the XZ plane from the positive side of the Y axis direction, the angle θb takes a positive value when deviated to the positive side of the X axis direction, and takes a negative value when deviated to the negative side of the X axis direction.

N instances of the phase shifter 120 are provided corresponding to N instances of the sub-array 110A, and the N phase shifters 120 are respectively connected to the antenna elements 111 of the N sub-arrays 110A. In each of the sub-arrays 110A, the four antenna elements 111 are connected in parallel to one phase shifter 120. The phase shifters 120 are an example of a phase adjustment unit.

In each of the sub-arrays 110A, the four antenna elements 111 are supplied with power transmission signals in the same phase. In addition, the phases of the power transmission signals output from the N phase shifters 120 to the respective N sub-arrays 110A are different from each other. Therefore, an angle (elevation angles) of a beam formed by radio waves radiated from the 4N antenna elements 111 can be controlled, respectively, in the XZ plane.

The beam formed by the radio waves radiated from the 4N antenna elements 111 is synonymous with a beam output from the array antenna 110. In addition, the beam output by the array antenna 110 are synonymous with a beam output by the antenna device 100A and the power supplying device 100.

The microwave generation source 130 is connected to the N phase shifters 120, and supplies microwaves of predetermined power. The microwave generation source 130 is an example of a radio wave generation source. The frequency of microwaves is, as an example, 915 MHz. Note that here, although a form will be described in which the power supplying device 100 includes the microwave generation source 130, it is not limited to generating microwaves, and may generate radio waves having a predetermined frequency.

The camera 140 is arranged between the (N/2)-th sub-array 110A and the (N/2+1)-th sub-array 110A in the X direction, and arranged in the Y-axis direction between the second antenna element 111 and the third antenna element 111 counted from the positive side of the Y axis direction among the four antenna elements 111 included in each of the sub-arrays. The camera 140 includes a fisheye lens 141 and a camera body 142. The camera 140 is an example of an image obtainment unit. In FIG. 2, the camera body 142 is illustrated to be divided into an imaging unit 142A and an image processing unit 142B.

The fisheye lens 141 is a lens that adopts an equidistant projection system. The position of the center of the fisheye lens 141 is, as an example, coincident with the center of the 4N antenna elements 111 and the origin of the XYZ-coordinate system. The camera body 142 is part of the camera 140 other than the fisheye lens 141, and may be a camera including a complementary metal oxide semiconductor (CMOS) image sensor or an infrared camera.

The camera 140 obtains an image including the marker 50A through the fisheye lens 141, and outputs the image data to the control device 150. The marker 50A is attached to the power receiving device 50B that includes an antenna for power reception, as a target to be irradiated with a beam output from the antenna device 100A and the power supplying device 100. The antenna device 100A and the power supplying device 100 obtain the position of the marker 50A included in the image obtained by the camera 140, and emit a beam toward the power receiving device 50B.

The camera body 142 includes the imaging unit 142A and the image processing unit 142B. The imaging unit 142A is a part that includes an imaging element to obtain image data by capturing an image through the fisheye lens 141. The image processing unit 142B executes image processing such as binarization of an image obtained by the imaging unit 142A and the like, and outputs a pixel index to the control device 150. The pixel index is XY coordinate values (address) indicating the position on an imaging screen of the marker 50A.

The control device 150 includes a position derivation unit 151, an elevation angle obtainment unit 152, a positional misalignment detection unit 153, a distance estimation unit 154, a control unit 155, and a memory 156. The control device 150 is implemented by a computer that includes a central processing unit (CPU) and a memory. The position derivation unit 151, the elevation angle obtainment unit 152, the positional misalignment detection unit 153, the distance estimation unit 154, and the control unit 155 are represented as functional blocks in terms of functions of a program executed by the control device 150. In addition, the memory 156 is a functional representation of a memory of the control device 150.

Figure 3:
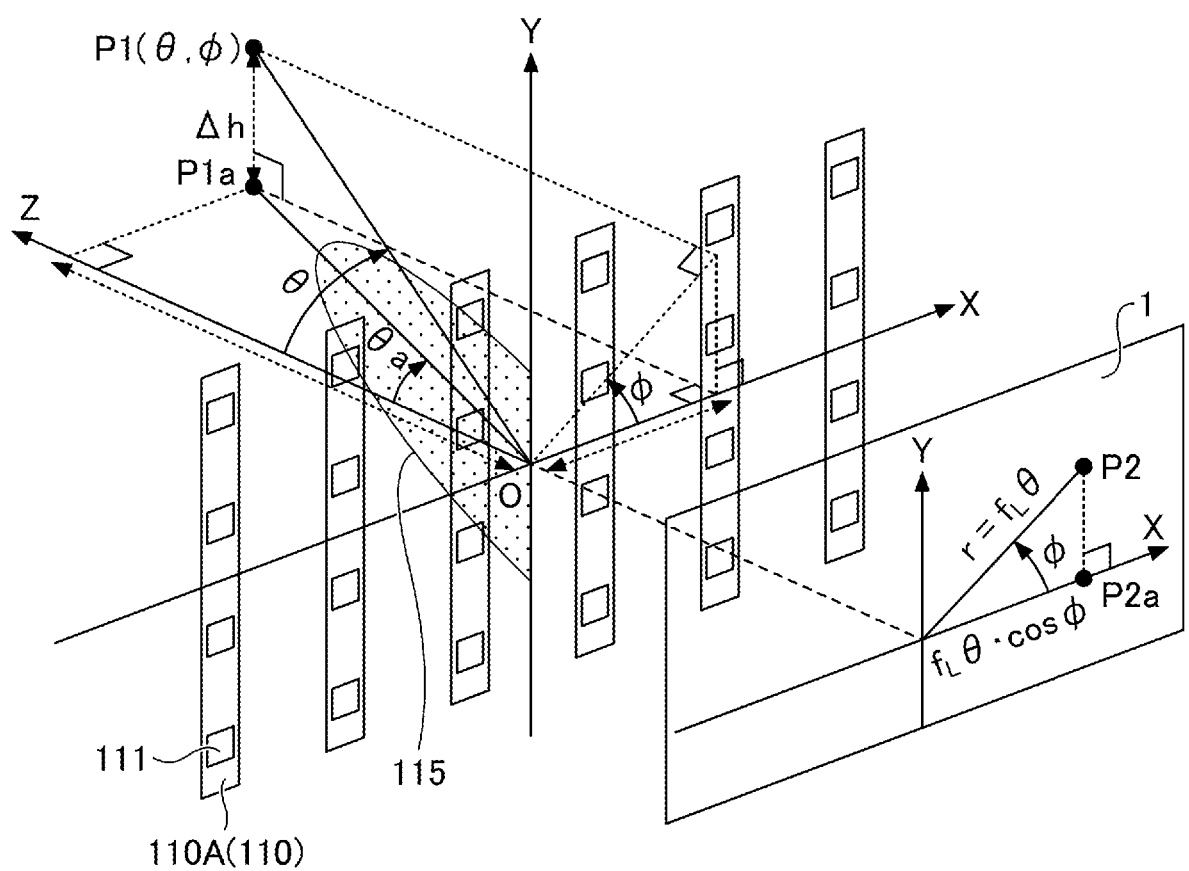
FIG. 3 is a diagram illustrating a polar coordinate system of an array antenna 110.

Here, the position derivation unit 151, the elevation angle obtainment unit 152, the positional misalignment detection unit 153, the distance estimation unit 154, the control unit 155, and the memory 156 will be described with reference to FIG. 3 in addition to FIGS. 1 and 2. FIG. 3 is a diagram illustrating a polar coordinate system of the array antenna 110. FIG. 3 illustrates the sub-arrays 110A of the array antenna 110 of the power supplying device 100, the antenna elements 111 included in each of the sub-arrays 110A, and a beam 115 output from the array antenna 110, whereas the other constituent elements are omitted. In addition, FIG. 3 illustrates the polar coordinate system on a plane 1 parallel to the XY plane.

In addition, the position of the marker 50A in the XYZ-coordinate system is denoted as P1, the elevation angle of a line segment connecting the origin O and the position P1 is denoted as θ, and the azimuth angle is denoted as φ. The elevation angle is an angle with respect to the positive Z axis direction, the azimuth angle is an angle with respect to the positive X direction, and a clockwise direction in plan view viewed from the positive side of the Z axis direction is positive-valued. In addition, an elevation angle formed between a line segment connecting a position P1a obtained by projecting the position P1 onto the XZ plane, and the origin O is denoted as θa.

The position P1 is an example of a first position, and the position P1a is an example of a projection position. In addition, the origin O is an example of a reference point of the XYZ coordinate system.

The antenna device 100A and the power supplying device 100 control the elevation angle of the beam 115 output by the array antenna 110 only in the XZ plane. This is based on assumptions that a beam is fixed in the Y-axis direction and can be swung in the elevation angle direction with the Z-axis as 0 degrees because the array antenna 110 supplies power in the same phase in the Y-axis direction, and that the position of the power receiving device 50B does not deviate significantly from the XZ plane (e.g., within approximately ±30 degrees in terms of the elevation angle with respect to the Z axis in the YZ plane). As long as the power receiving device 50B is positioned at such a position, the power receiving device 50B can be efficiently irradiated with the beam 115 by simply controlling the elevation angle of the beam 115 in the XZ plane, while suppressing the size of the control unit of the array antenna 110.

The position derivation unit 151 calculates the center of gravity of an image of the position marker, based on a pixel index output from the image processing unit 142B. The pixel index output from the image processing unit 142B represents an image of equidistant projection obtained through the fisheye lens 141. By this image processing, the position P1 of the marker included in the image obtained by the camera 140 with respect to the array antenna 110 is converted into a position P2 in polar coordinates on the XY plane. In this way, the position derivation unit 151 derives the position P2. The position P1 is the position of the center of gravity calculated by the position derivation unit 151. The position P2 is an example of a second position.

The position P2 is represented by a radius vector r and a deflection angle φ from the origin O. Denoting the focal length of the fisheye lens 141 as $f_L$, the radius vector r is expressed as $r=f_L\theta$. The deflection angle φ is the same as the azimuth angle φ. The position derivation unit 151 obtains r·cos φ by mapping the radius vector r onto the X-axis by the image processing described above. The position derivation unit 151 outputs data representing the position P2 to the elevation angle obtainment unit 152.

The elevation angle obtainment unit 152 obtains (calculates), as the elevation angle θa, a value (r·cos φ/$f_L$) obtained by dividing the X-coordinate (r·cos φ) of the mapped position P2a obtained by mapping the position P2 on the X-axis, by the focal distance $f_L$ of the fisheye lens 141. The reason why the elevation angle θa can be obtained in this way will be described later. The elevation angle obtainment unit 152 outputs the elevation angle θa to the distance estimation unit 154 and the control unit 155.

The positional misalignment detection unit 153 determines a shape and a center of gravity of the marker 50A, based on a pixel index output from the image processing unit 142B, and detects a positional misalignment between the camera 140 and the marker 50A in the Y-axis direction based on the position of the center of gravity within a range in which the marker 50A is present. The position of the center of the fisheye lens 141 is, as an example, coincident with the center of the 4N antenna elements 111 and the origin of the XYZ-coordinate system; therefore, as an example, the position of the center of gravity in the Y-axis direction in the case where no positional misalignment occurs between the camera 140 and the marker 50A may be set to Y=0. If the determined position in the Y-axis direction of the center of gravity within the presence range of the marker 50A is Y=0, the positional misalignment detection unit 153 determines that no positional misalignment occurs between the camera 140 and the marker 50A. In addition, if the determined position in the Y-axis direction of the center of gravity within the presence range of the marker 50A is not Y=0, the positional misalignment detection unit 153 determines that a positional misalignment occurs between the camera 140 and the marker 50A, and detects the positional misalignment. The positional misalignment detection unit 153 outputs the detection result to the distance estimation unit 154. Note that the position of the center of gravity may be obtained from the position derivation unit 151.

When the elevation angle θa calculated by the elevation angle obtainment unit 152 is zero degrees (0 degrees), based on the number of pixel indices output from the image processing unit 142B of the camera 140, the distance estimation unit 154 estimates the distance from the center of the fisheye lens 141 to the marker 50A. The elevation angle θa being 0 degrees means that the marker 50A is present in front of the fisheye lens 141 in the Z-axis direction (the center of gravity of the marker 50A is present on the Z axis).

The distance estimation unit 154 estimates a facing distance r FD from the center of the fisheye lens 141 to the marker 50A when the elevation angle θa is 0 degrees. The facing distance $r_{FD}$ is a distance when the marker 50A faces the camera 140 on the Z-axis.

For example, in the case where the camera 140 and the marker 50A are separated by multiple types of distances on the Z-axis, the number of multiple binarized pixel indices obtained by the image processing unit 142B is stored in the memory 156 in advance. Then, when the elevation angle θa is zero degrees (0 degrees), the distance estimation unit 154 counts the number of pixel indices output from the image processing unit 142B of the camera 140, compares the number of pixel indices with multiple reference data items corresponding to the multiple facing distances $r_{FD}$ stored in the memory 156, and thereby, estimates a facing distance $r_{FD}$ from the center of the fisheye lens 141 to the marker 50A when the elevation angle θa is 0 degrees. The number of pixel indices varies depending on the facing distance $r_{FD}$; therefore, based on the number of pixel indices, the facing distance $r_{FD}$ can be estimated.

Note that in the case where when the elevation angle θa is zero degrees (0 degrees), the pixel index is output multiple times from the image processing unit 142B of the camera 140, the facing distance $r_{FD}$ may be estimated based on an average of the number of multiple pixel indices.

In addition, as the fisheye lens 141 is used, in the case where a positional misalignment occurs between the camera 140 and the marker 50A, as compared with the case where no positional misalignment occurs between the camera 140 and the marker 50A, the number of pixel indices becomes smaller even if the facing distance $r_{FD}$ is the same. Therefore, in the case where the positional misalignment detection unit 153 determines that a positional misalignment occurs between the camera 140 and the marker 50A in the Y-axis direction, the distance estimation unit 154 may store in the memory 156 in advance, data representing a degree of change in the number of pixel indices with respect to a positional misalignment in the Y-axis direction, to estimate the facing distance $r_{FD}$ using the number of pixel indices corrected according to the degree of the positional misalignment in the Y-axis direction.

The control unit 155 controls the shift value of the phase in the phase shifter 120 so as to make the direction of a beam radiated by the array antenna 110 become an elevation angle θa in the XZ plane. The elevation angle θa is obtained by the elevation angle obtainment unit 152. In addition, the control unit 155 executes output control of the microwave generation source 130, imaging control of the camera 140, and the like.

Specifically, the control unit 155 controls the shift value of the phase in the phase shifter 120 as follows. The control unit 155 reads, from the memory 156, phase data corresponding to the facing distance $r_{FD}$, estimated by the distance estimation unit 154 and the elevation angle θa obtained by the elevation angle obtainment unit 152, and controls shift values of the phases in the N phase shifters 120 based on the read phase data.

Here, in order for the antenna of the power receiving device 50B to efficiently receive power, it is ideal that the phases of power transmission signals when the antenna of the power receiving device 50B receives power from the N sub-arrays 110A are equal. Meanwhile, the antenna device 100A and the power supplying device 100 transmit power transmission signals from the array antenna 110 to the power receiving device 50B positioned at a short distance of, for example, approximately 3 m to 7 m. In the case of transmitting power to the power receiving device 50B installed on the inner wall 51 of the tunnel, in a state where the angle θb is 0 degrees, the distance from the array antenna 110 to the power receiving device 50B is approximately 3 m to approximately 5 m.

As power transmission in such a short distance is assumed, a relative difference in distance from each of the N sub-arrays 110A to the antenna of the power receiving device 50B is comparatively great, and when the N sub-arrays 110A transmit power to the same target, the phases of power transmission signals received by the antenna of the power receiving device 50B from the N sub-arrays 110A are not aligned, and the power receiving device 50B cannot receive power efficiently. The difference in distance from each of the N sub-arrays 110A to the antenna of the power receiving device 50B depends on the angle θb and the distance in the Z-axis direction from the N sub-arrays 110A to the antenna of the power receiving device 50B.

Therefore, the antenna device 100A and the power supplying device 100 use phase data for adjusting the phase when each of the N sub-arrays 110A transmits power, so as to make the phases aligned among the power transmission signals received by the antenna of the power receiving device 50B from the N sub-arrays 110A. Here, as an example, assuming that power transmission is executed when the elevation angle θa changes from +70 degrees to −70 degrees as the antenna device 100A and the power supplying device 100 move, multiple sets of phase data are provided with which the shift values of the phases of the N sub-arrays 110A can be adjusted in increments of one degree. Each set of phase data includes shift values of N phases to be set in the N phase shifters 120 respectively connected to the N sub-arrays 110A corresponding to a certain elevation angle θa. Such 141 sets of phase data in increments of one degree in a range from +70 degrees to −70 degrees of the elevation angle θa are prepared as the multiple sets of phase data for a certain facing distance $r_{FD}$. In addition, in order to make the shift values of the phases of the N sub-arrays 110A adjustable according to each of the multiple facing distances $r_{FD}$, multiple sets of phase data are prepared for the multiple facing distances $r_{FD}$. Note that the phase data is data generated based on the angle θb; therefore, FIG. 2 illustrates multiple sets of phase data $\psi_3(\theta b)$ to $\psi_7(\theta b)$ using θb. The control unit 155 may use multiple sets of phase data for an angle θb that is equal to the elevation angle θa.

The control unit 155 uses the multiple sets of phase data corresponding to the facing distance $r_{FD}$, estimated by the distance estimation unit 154, and uses phase data for an angle θb equal to the elevation angle θa obtained by the elevation angle obtainment unit 152 from among the multiple sets of phase data, to control the shift values of the phases of the N phase shifters 120.

The memory 156 stores a program executed when the position derivation unit 151, the elevation angle obtainment unit 152, and the control unit 155 execute processing, data used upon execution of the program, data generated by execution of the program, image data obtained by the camera 140, and the like. In addition, the memory 156 stores multiple sets of phase data for each of multiple facing distances $r_{FD}$. As an example, for five types of facing distances $r_{FD}$ of 3 m, 4 m, . . . , 7 m, 141 sets of phase data are stored in increments of one degree for the range of the elevation angle θa from +70 degrees to −70 degrees.

Next, a method for determining the elevation angle θa will be described.

Using the azimuth angle φ and the elevation angle θ, the elevation angle θa can be obtained by the following Formula (1) from a geometric relationship between the position P1 and the position P1a.

[Math. 1]

$$\theta a = \frac{\pi}{2} - \tan^{-1}\left\{\frac{1}{\cos\phi}\tan\left(\frac{\pi}{2} - \theta\right)\right\} \quad (1)$$

By expanding Formula (1), Formula (2) is obtained.

[Math. 2]

$$\tan\theta a = \cos\varphi \tan\theta \tag{2}$$

Here, in the case where the elevation angle θ is sufficiently small, tan θ≈θ; in the case where the azimuth angle φ is sufficiently small, cos φ≈1; and in the case where the azimuth angle φ is close to 90 degrees, cos φ≈0, and hence, Formula (2) can be transformed into the following Formula (3):
[Math. 3]

$$\theta a = \theta \cos\varphi \tag{3}$$

In other words, in the case where the position of the power receiving device 50B does not deviate significantly from the XZ plane, the elevation angle θa can be approximated as in Formula (3).

In addition, as described above, denoting the focal length of the fisheye lens 141 as $f_L$, the radius vector r is expressed by the following Formula (4):
[Math. 4]

$$r = f_L \theta \tag{4}$$

From Formulas (3) and (4), the elevation angle θa can be expressed by the following Formula (5):
[Math. 5]

$$\theta a = r \cdot \cos\varphi / f_L \tag{5}$$

In this way, by using Formula (5), the elevation angle θa can be determined approximately.

Figure 4:
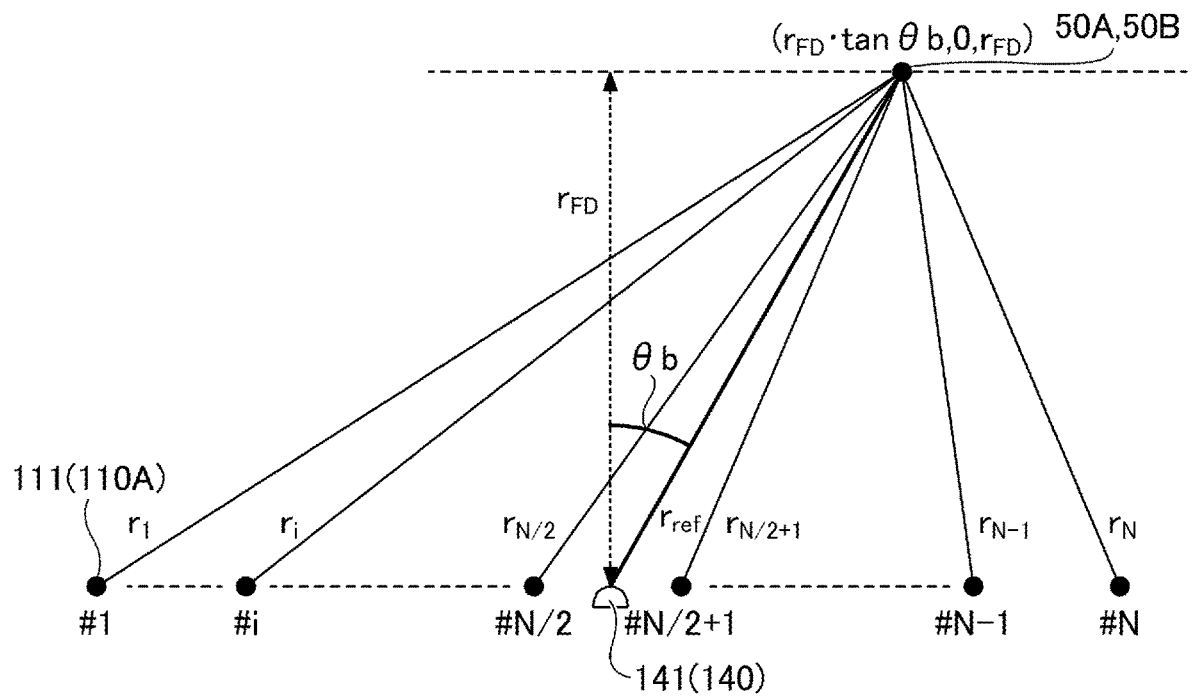
FIG. 4 is a diagram illustrating a method of obtaining phase data.

Next, a method of obtaining phase data will be described. FIG. 4 is a diagram illustrating a method of obtaining phase data. FIG. 4 illustrates the fisheye lens 141, the marker 50A, the power receiving device 50B, and the N antenna elements 111 of the camera 140. Each antenna element 111 is one of the four antenna elements 111 included in the N sub-arrays 110A. The position of the marker 50A is equal to the position of the power receiving device 50B.

As illustrated in FIG. 4, the distances from the N sub-arrays 110A to the marker 50A are denoted as $r_1$ to $r_N$. Here, in order to simplify the description, it is assumed that no positional misalignment occurs between the camera 140 and the marker 50A in the Y-axis direction. The center of the 4N antenna elements 111 is coincident with the origin of the XYZ-coordinate system; therefore, the coordinates of the center of the 4N antenna elements 111 are (X, Y, Z)=(0, 0, 0). In addition, no positional misalignment occurs between the camera 140 and the marker 50A in the Y-axis direction; the facing distance is $r_{FD}$; and the angle of the power receiving device 50B viewed from the fisheye lens 141 is θb; therefore, the position of the power receiving device 50B can be expressed as (X, Y, Z)=($r_{FD}$·tan θb, 0, $r_{FD}$). Here, denoting the distance from the fisheye lens 141 to the 50B of the power receiving device as $r_{ref}$, the distance $r_{ref}$ can be expressed by the following Formula (6):
[Math. 6]

$$r_{ref} = \sqrt{(r_{FD} \cdot \tan\theta b)^2 + 0^2 + r_{FD}^2} \tag{6}$$

Denoting the position of the i-th antenna element 111 among the N antenna elements 111 by (X, Y, Z)=($d_i$, 0, 0), the distance $r_i$ from the i-th antenna element 111 to the power receiving device 50B can be expressed by the following Formula (7):
[Math. 7]

$$r_i = \sqrt{(r_{FD} \cdot \tan\theta b - d_i)^2 + 0^2 + r_{FD}^2} \tag{7}$$

Therefore, a path difference $\tau_i$ between the distance $r_{ref}$ from the fisheye lens 141 to the 50B of the power receiving device and the distance $r_i$ from the i-th antenna element 111 to the 50B of the power receiving device can be expressed by the following Formula (8):
[Math. 8]

$$\tau_i = r_i - r_{ref} \tag{8}$$

The path difference $\tau_i$ is represented in units of meters; therefore, once the phase difference $\psi_i$ is calculated in terms of a wavelength λ of the microwave to be used, it can be expressed by the following Formula (9):

[Math. 9]

$$\psi_{r_{FD},i}(\theta b) = 2\pi \cdot \frac{\text{mod}(\tau_i, \lambda)}{\lambda} \tag{9}$$

$-\psi_{r_{FD,i}}(\theta b)$ obtained by inverting the sign of the phase difference expressed by Formula (9) may be taken as a phase to be set in the phase shifter 120 when the i-th antenna element 111 transmits power, and multiple sets of phase data corresponding to multiple elevation angles θa may be prepared for the N sub-arrays 110A, to be stored in the memory 156. In addition, multiple sets of phase data for multiple facing distances $r_{FD}$ may be prepared to be stored in the memory 156. By using such multiple sets of phase data, power transmission signals transmitted from the N sub-arrays 110A can reach the power receiving device 50B in the same phase. Multiple sets of phase data corresponding to multiple angles θb are expressed by the following Formula (10):
[Math. 10]

$$\psi_{r_{FD}}(\theta b) = \{-\psi_{r_{FD},1}(\theta b), \ldots, -\psi_{r_{FD},N}(\theta b)\} \tag{10}$$

By using the phase data of the angle θb corresponding to the elevation angle θa, the control unit 155 may set shift values in the N phase shifters 120 respectively connected to the N sub-arrays 110A.

Figure 5:
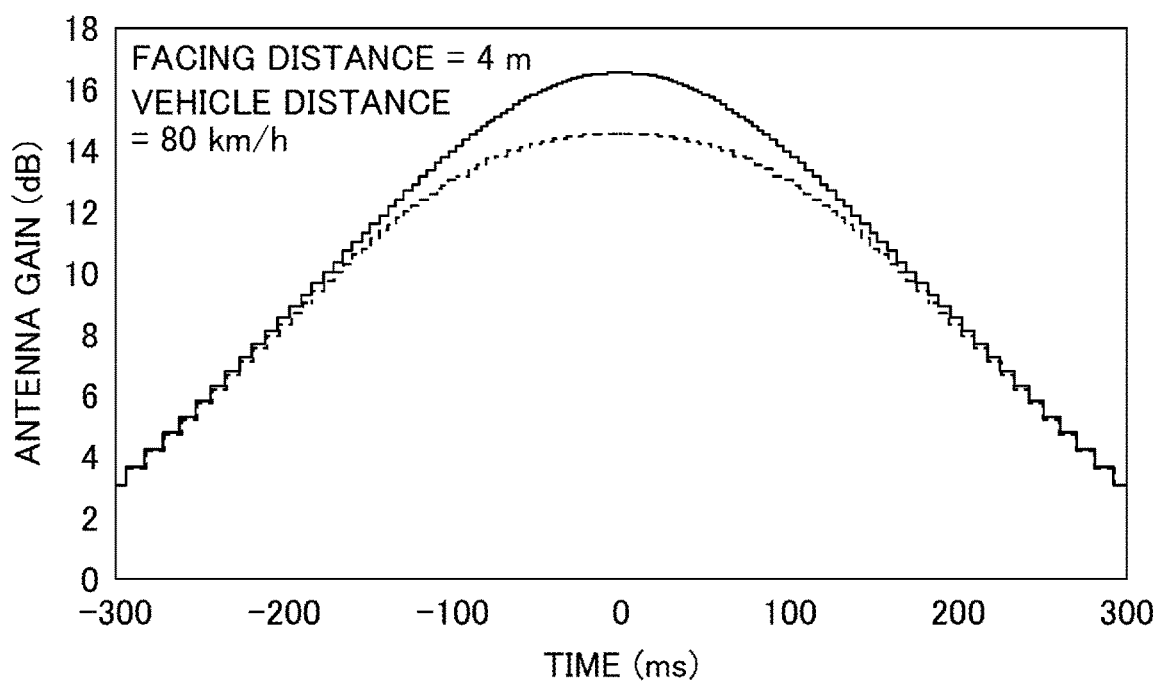
FIG. 5 is a diagram illustrating effects of an antenna device 100A and a power supplying device 100.

FIG. 5 is a diagram illustrating effects of the antenna device 100A and the power supplying device 100. FIG. 5 is a diagram illustrating an antenna gain when the antenna of the power receiving device 50B receives power in the case where the facing distance $r_{FD}$ is 4 m, and the speed of the vehicle having the antenna device 100A and the power supplying device 100 installed is 80 km/h. The horizontal axis represents time, 0 seconds represents time at which the elevation angle θa becomes 0 degrees, −300 seconds represents time at which the elevation angle θa becomes +70 degrees, and +300 seconds represents time at which the elevation angle θa becomes −70 degrees. In other words, the time on the horizontal axis corresponds to the elevation angle θa.

In addition, in FIG. 5, the antenna gain in the case where in the antenna device 100A and the power supplying device 100 adjust the shift values in the phase shifters 120 by using phase data based on the facing distance and the elevation angle is indicated by a solid line, and the antenna gain in the case where the phase data based on only the elevation angle is used is indicated by a broken line for comparison. The antenna gain in the case of using phase data based on only the elevation angle is an antenna gain obtained in the power receiving device 50B in the case where the shift values in the N phase shifters 120 connected to the N sub-arrays 110A are set to values corresponding to the elevation angle θa.

As illustrated in FIG. 5, the antenna gain in the case where using phase data based on the facing distance and the elevation angle is greater or equal to the antenna gain in the case of using phase data based on only the elevation angle, and in a period of time closer to 0 seconds (as the absolute value of the elevation angle θa is smaller), the difference between the antenna gain in the case where using phase data based on the facing distance and the elevation angle and the antenna gain in the case of using phase data based on only the elevation angle, becomes greater. When the elevation angle θa is closer to 0 degrees, the distance between the N sub-arrays 110A and the power receiving device 50B becomes shorter; it is considered that the effect of individual phase control of the N sub-arrays 110A based on the facing distance and the elevation angle becomes remarkable.

As described above, in the case where to control the elevation angle of a beam of the array antenna 110 only in the XZ plane, the position P1 obtained by the equidistant projection is converted into polar coordinates on a plane parallel to the XY plane, to obtain the position P2, and further, the X-coordinate (r·cos φ) of the mapped position P2a obtained by mapping the position P2 on the X-axis is divided by the focal distance $f_L$ of the fisheye lens 141 to obtain the elevation angle θa (=r·cos φ/$f_L$).

Then, by using the phase data of the angle θb corresponding to the elevation angle θa, the control unit 155 may set shift values in the N phase shifters 120 respectively connected to the N sub-arrays 110A. By using the phase data corresponding to the change of the elevation angle θa caused by movement of the antenna device 100A and the power supplying device 100 to control the shift values in the N phase shifters 120, while the antenna device 100A and the power supplying device 100 move, the N sub-arrays 110A can always transmit power transmission signals in the same phase the to the antenna of the power receiving device 50B.

Therefore, the antenna device 100A and the power supplying device 100 capable of transmitting power that allows a power receiving device to efficiently receive power even at a short distance, can be provided.

In addition, multiple sets of phase data for multiple facing distances $r_{FD}$ are stored in the memory 156, and the distance estimation unit 154 estimates the facing distance $r_{FD}$; therefore, by using multiple sets of phase data corresponding to the facing distance $r_{FD}$, the shift values in the N phase shifters 120 respectively connected to the N sub-arrays 110A can be set. Therefore, by using multiple sets of phase data corresponding to distances to the power receiving device 50B in the Z-axis direction, depending on the distance to the power receiving device 50B in the Z-axis direction, the antenna device 100A and the power supplying device 100 capable of transmitting power that allows a power receiving device to efficiently receive power even at a short distance, can be provided. Note that for example, in the case where in the case where multiple sets of phase data corresponding to the facing distance $r_{FD}$ are not provided, phase data corresponding to a facing distance $r_{FD}$ closest to an estimated facing distance $r_{FD}$ may be used.

In addition, in the case where the positional misalignment detection unit 153 detects a positional misalignment between the camera 140 and the marker 50A in the Y-axis direction, and the positional misalignment occurs, the distance estimation unit 154 reads from the memory 156 data representing a degree of change in the number of pixel indices with respect to a positional misalignment in the Y-axis direction, and by using the pixel index number corrected according to the degree of the positional misalignment in the Y-axis direction, estimates the facing distance $r_{FD}$. Therefore, in the case where a positional misalignment occurs between the camera 140 and the marker 50A in the Y-axis direction, the control unit 155 uses multiple sets of phase data corresponding to the facing distance $r_{FD}$ estimated by using the corrected pixel index number; therefore, even in the case where a positional misalignment occurs between the camera 140 and the marker 50A in the Y-axis direction, depending on the distance to the power receiving device 50B in the Z-axis direction, the antenna device 100A and the power supplying device 100 capable of transmitting power that allows a power receiving device to efficiently receive power even at a short distance, can be provided.

In addition, the antenna device 100A and the power supplying device 100 control the elevation angle of a beam output by the array antenna 110 only in the XZ plane; therefore, as compared with the case where the elevation angle is controlled in both the XZ plane and the YZ plane, the number of phase shifters 120 can be reduced to one fourth. Therefore, the antenna device 100A and the power supplying device 100 can be implemented at low cost.

Note that as above, a form has been described in which the position of the center of the fisheye lens 141 is coincident with the center of the 4N antenna elements 111. However, the center of the fisheye lens 141 may be offset from the center of the 4N antenna elements 111. In this case, the coordinate origin of the array antenna control phase calculation may be shifted by the amount of positional misalignment. Alternatively, the marker 50A and the power receiving antenna may be installed to be separated from each other by the amount of positional misalignment.

In addition, as above, although a form in which the control device 150 includes the positional misalignment detection unit 153 has been described, for example, in the case where it is known that a positional misalignment between the camera 140 and the marker 50A would not occur, the control device 150 may not include the positional misalignment detection unit 153, and the distance estimation unit 154 may not execute correction corresponding to the positional misalignment.

In addition, as above, although a form in which the control device 150 includes the distance estimation unit 154 has been described, for example, in applications where the facing distance $r_{FD}$ is known to be constant, the control device 150 may not include the distance estimation unit 154 and the positional misalignment detection unit 153, and multiple sets of phase data corresponding to one type of facing distance $r_{FD}$ may be stored in the memory 156.

Figure 6:
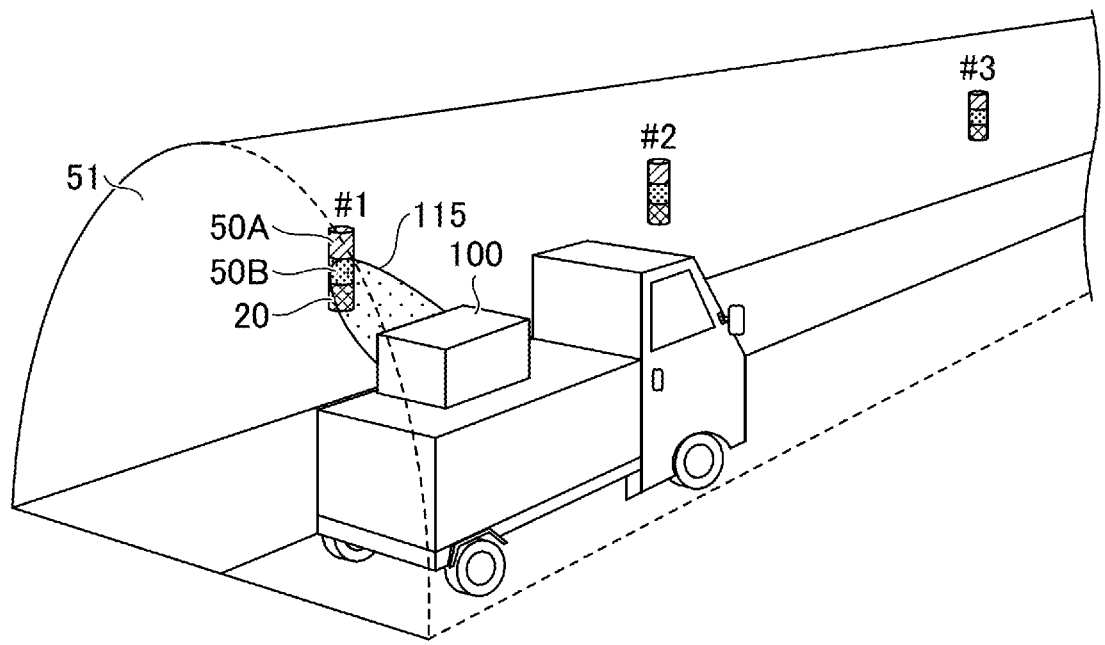
FIG. 6 is a diagram illustrating an application example of the power supplying device 100.

FIG. 6 is a diagram illustrating an application example of the power supplying device 100. The power supplying device 100 is installed in a vehicle as an example, and an antenna 20 as a target is provided on the inner wall 51 of a tunnel. The marker 50A and the power receiving device 50B are attached to the antenna 20. The marker 50A is a retroreflective plate, a mirror ball, or the like. The distance between the inner wall 51 of the tunnel and the vehicle varies from one tunnel to another. However, in the same tunnel, the distance between the inner wall of the tunnel and the vehicle can be considered to be substantially constant.

When the vehicle travels in the positive X direction, by converting the position of the marker 50A into polar coordinates on a plane parallel to the XY plane by the camera 140, and further, by dividing the X-coordinate (r·cos φ) of the mapped position mapped onto the X-axis (a mapped position corresponding to P2a) by the focal distance $f_L$ of the fisheye lens 141, the elevation angle θa (r·cos φ/$f_L$) can be obtained. Then, by controlling the shift values in the N phase shifters 120 based on phase data corresponding to change in the elevation angle θa read from the memory 156, while the antenna device 100A and the power supplying device 100 move, the N sub-arrays 110A can always transmit power transmission signals in the same phase the to the antenna 20 of the power receiving device 50B. The antenna 20 is irradiated with power transmission signals in the same phase as a beam.

In addition, for example, when the elevation angle θa of the marker 50A of #1 is zero degrees (0 degrees), the facing distance from the center of the fisheye lens 141 of the camera 140 to the marker 50A can be estimated. Then, when the power transmission signal is transmitted to the antenna 20 of the power receiving device 50B of the marker 50A of #2, the antenna gain can be further improved by reading phase data based on the facing distance and the elevation angle from the memory 156 and controlling the shift values in the N phase shifters 120.

For example, a fixing part for fixing an infrastructure such as a jet fan attached to the inner wall 51 of the tunnel and a sign or the like fixed to the inner wall 51, is provided with an antenna 20, a sensor for monitoring loosening of bolts or the like in the fixing part, a rectenna, and a wireless communication module; when a beam is radiated from the power supplying device 100 to the antenna 20 while the vehicle is traveling, the rectenna connected to the antenna 20 generates power to turn on the wireless communication module, the wireless communication module emits a signal that represents output of the sensor, and by receiving the signal on the vehicle side, it becomes possible to inspect the fixing state of the infrastructure while traveling.

In this case, in the array antenna 110, the wireless communication module may receive a signal that represents output of the sensor.

In addition, an X-coordinate (r·cos φ) of a mapped position (a mapped position corresponding to P2a) mapped on the X-axis from a position of the antenna 20 deviated from the XZ plane is obtained, and a value (r·cos φ/$f_L$) obtained by dividing the X-coordinate (r·cos φ) by the focal distance $f_L$ of the fisheye lens 141 is used as the elevation angle θa to control a beam; therefore, even in the case where a vehicle traveling in the X-axis direction is shifted to either the plus side or the minus side of the Y-axis, the elevation angle θa can be obtained by absorbing the positional misalignment.

In addition, here, by using FIG. 6, although a form has been described in which the power supplying device 100 (antenna device 100A) communicates with the wireless communication module provided on the inner wall 51 of the tunnel, the wireless communication module is not limited to the one provided on the inner wall 51 of the tunnel, and may be installed in various places and the like. In this way, the power supplying device 100 (antenna device 100A) can be used as a communication device.

As above, the antenna device, the power supplying device, and the power supplying method according to exemplary embodiments of the present invention have been described; note that the present invention is not limited to the specifically disclosed embodiments, and various modifications and changes can be made without departing from the scope of the claims.

Note that the present international application claims priority based on Japanese Patent Application No. 2020-151849 filed on Sep. 10, 2020, the entire contents of which are incorporated herein by reference.

LIST OF REFERENCE NUMERALS

100 power supplying device
110 array antenna
110A sub-array
111 antenna element
120 phase shifter
130 microwave generation source
140 camera
141 fisheye lens
150 control device
151 position derivation unit
152 elevation angle obtainment unit
153 positional misalignment detection unit
154 distance estimation unit
155 control unit
156 memory

The invention claimed is:

1. An antenna device comprising:
   an array antenna having a plurality of antenna elements arranged in two dimensions along a first axis and a second axis;
   a plurality of phase shifters configured to adjust a phase of a power transmission signal supplied to each of the plurality of antenna elements in a first axis direction;
   a camera configured to obtain an image through a fisheye lens;
   a memory; and
   a processor configured to execute
   converting a first position of a marker relative to the camera included in the image obtained by the camera, into a second position in polar coordinates on a first plane including the first axis and the second axis;
   obtaining, based on the second position, an elevation angle of a projection position obtained by projecting the first position onto a second plane including the first axis and a third axis, with respect to the third axis in the second plane;
   storing in the memory, a plurality of sets of phase data corresponding to a plurality of elevation angles, the phase data representing a plurality of phases when power is transmitted from the plurality of antenna elements to a power receiving device positioned at a position of the marker, the plurality of phases received by the power receiving device from the plurality of antenna elements being adjusted to be aligned; and
   reading the phase data corresponding to the elevation angle obtained by the obtaining from the memory, and controlling the phase shifters based on the read phase data so as to make a direction of a beam radiated by the array antenna become the elevation angle in the second plane.

2. The antenna device as claimed in claim 1, wherein the processor further executes:
   estimating a distance from the camera to the marker based on the image obtained by the camera when the elevation angle obtained by the obtaining is zero degrees,
   storing in the memory, the plurality of sets of phase data according to a plurality of types of distances from the image obtainment unit to the marker, and
   reading, from the memory, the phase data corresponding to the distance estimated by the estimating and the elevation angle obtained by the obtaining, and controlling the phase shifters based on the read phase data.

3. The antenna device as claimed in claim 2, wherein the processor further executes:
   detecting a positional misalignment between the camera and the marker in the second axial direction, based on a position of a center of gravity of the marker included in the image obtained by the camera, wherein the estimating estimates the distance from the camera to the marker, based on an image corrected according to a degree of the positional misalignment detected by the detecting.

4. The antenna device as claimed in claim 1, wherein the obtaining obtains, as the elevation angle, a value obtained by dividing a coordinate of a mapped position obtained by mapping the second position onto the first axis, by a focal length of the fisheye lens.

5. The antenna device as claimed in claim 4, wherein the coordinate of the mapped position is expressed by a value obtained by multiplying a radius vector in polar coordinates by cosine of a deflection angle.

6. The antenna device as claimed in claim 1, wherein the plurality of antenna elements are grouped into a plurality of sub-arrays extending along the second axis direction, and
wherein the plurality of phase shifters are respectively connected to the plurality of sub-arrays and configured to adjust a phase of the power transmission signal for each of the sub-arrays.

7. A power supplying device comprising:
an array antenna having a plurality of antenna elements arranged in two dimensions along a first axis and a second axis;
a radio wave generation source;
a plurality of phase shifters provided between the array antenna and the radio wave generation source, and configured to adjust a phase of a power transmission signal supplied to each of the plurality of antenna elements in a first axis direction;
a camera configured to obtain an image through a fisheye lens;
a memory; and
a processor configured to execute
converting a first position of a marker relative to the camera included in the image obtained by the camera, into a second position in polar coordinates on a first plane including the first axis and the second axis;
obtaining, based on the second position, an elevation angle of a projection position obtained by projecting the first position onto a second plane including the first axis and a third axis, with respect to the third axis in the second plane;
storing in the memory, a plurality of sets of phase data corresponding to a plurality of elevation angles, the phase data representing a plurality of phases when power is transmitted from the plurality of antenna elements to a power receiving device positioned at a position of the marker, the plurality of phases received by the power receiving device from the plurality of antenna elements being adjusted to be aligned; and
reading the phase data corresponding to the elevation angle obtained by the obtaining from the memory, and controlling the phase shifters based on the read phase data so as to make a direction of a beam radiated by the array antenna become the elevation angle in the second plane.

8. A power supplying method executed by a power supplying device including:
an array antenna having a plurality of antenna elements arranged in two dimensions along a first axis and a second axis;
a radio wave generation source;
a plurality of phase shifters provided between the array antenna and the radio wave generation source, and configured to adjust a phase of a power transmission signal supplied to each of the plurality of antenna elements in a first axis direction;
a camera configured to obtain an image through a fisheye lens;
a memory; and
a processor,
the power supplying method comprising:
converting a first position of a marker relative to the camera included in the image obtained by the camera, into a second position in polar coordinates on a first plane including the first axis and the second axis;
obtaining, based on the second position, an elevation angle of a projection position obtained by projecting the first position onto a second plane including the first axis and a third axis, with respect to the third axis in the second plane;
storing in the memory, a plurality of sets of phase data corresponding to a plurality of elevation angles, the phase data representing a plurality of phases when power is transmitted from the plurality of antenna elements to a power receiving device positioned at a position of the marker, the plurality of phases received by the power receiving device from the plurality of antenna elements being adjusted to be aligned; and
reading the phase data corresponding to the elevation angle obtained by the obtaining from the memory, and controlling the phase shifters based on the read phase data so as to make a direction of a beam radiated by the array antenna become the elevation angle in the second plane.

* * * * *